(12) United States Patent
Rud et al.

(10) Patent No.: US 11,320,316 B2
(45) Date of Patent: May 3, 2022

(54) NON-INVASIVE PROCESS FLUID TEMPERATURE INDICATION WITH REDUCED ERROR

(71) Applicant: Rosemount Inc., Shakopee, MN (US)

(72) Inventors: Jason H. Rud, Chanhassen, MN (US); Aleksey A. Krivonogov, Chelyabinsk (RU); Yury N. Kuznetsov, Snezhinsk (RU); Sait S. Garipov, Kopeysk (RU); Sergey A. Fomchenko, Chelyabinsk (RU); Allen J. Kassen, St. Louis Park, MN (US); Kyle S Warren, Shakopee, MN (US)

(73) Assignee: Rosemount Inc., Shakopee, MN (US)

( * ) Notice: Subject to any disclaimer, the term of this patent is extended or adjusted under 35 U.S.C. 154(b) by 557 days.

(21) Appl. No.: 16/296,521

(22) Filed: Mar. 8, 2019

(65) Prior Publication Data

US 2020/0103287 A1    Apr. 2, 2020

Related U.S. Application Data

(63) Continuation of application No. PCT/RU2018/000629, filed on Sep. 28, 2018.

(51) Int. Cl.
*G01K 1/14* (2021.01)
*G01K 7/02* (2021.01)
(Continued)

(52) U.S. Cl.
CPC .................. *G01K 1/14* (2013.01); *G01K 1/08* (2013.01); *G01K 7/021* (2013.01); *G01K 7/16* (2013.01)

(58) Field of Classification Search
CPC ............ G01K 1/14; G01K 1/143; G01K 1/08; G01K 7/16; G01K 7/427; G01K 13/02; G01K 13/024; G01K 13/026
See application file for complete search history.

(56) References Cited

U.S. PATENT DOCUMENTS

| 3,276,437 | A | 10/1966 | Jonakin et al. |
| 3,533,273 | A | 10/1970 | Green |

(Continued)

FOREIGN PATENT DOCUMENTS

| CN | 201945401 U | 8/2011 |
| CN | 104062034 B | 9/2014 |

(Continued)

OTHER PUBLICATIONS

Machine translation of FR-2724727 (Year: 1996).*

(Continued)

*Primary Examiner* — Nathaniel J Kolb
(74) *Attorney, Agent, or Firm* — Christopher R. Christenson; Kelly, Holt & Christenson PLLC

(57) ABSTRACT

A process fluid temperature estimation system includes a mounting assembly, a sensor capsule, measurement circuitry, and a controller. The mounting assembly is configured to mount the process fluid temperature estimation system to an external surface of a process fluid conduit. The sensor capsule has an end that is configured to contact the external surface of the process fluid conduit to form an interface having a contact region and an air gap. The sensor capsule also has at least one temperature sensitive element disposed therein. The measurement circuitry is coupled to the sensor capsule and configured to detect an electrical characteristic of the at least one temperature sensitive element that varies with temperature and provide at least process fluid conduit skin temperature information. The controller is coupled to the measurement circuitry and is configured to obtain the process fluid conduit skin temperature information from the measurement circuitry and to obtain reference temperature information. The controller is configured to obtain a heat flow parameter related to the air gap of the interface and to employ a heat transfer calculation (Continued)

with the process fluid conduit skin temperature information, reference temperature information, and heat flow parameter to generate an estimated process fluid temperature output.

22 Claims, 9 Drawing Sheets

(51) Int. Cl.
  *G01K 7/16* (2006.01)
  *G01K 1/08* (2021.01)

(56) References Cited

U.S. PATENT DOCUMENTS

| | | | |
|---|---|---|---|
| 3,607,445 A | 9/1971 | Hines | |
| 3,724,267 A | 4/1973 | Zoschak | |
| 3,913,378 A | 10/1975 | Hausler | |
| 3,913,403 A | 10/1975 | Arcara | |
| 4,075,036 A | 2/1978 | Lysikov et al. | |
| 4,186,605 A | 2/1980 | Bourigault | |
| 4,346,864 A | 8/1982 | Feller | |
| 4,355,908 A | 10/1982 | Weisser et al. | |
| 4,384,793 A | 5/1983 | O'Brien | |
| 4,396,300 A | 8/1983 | Characklis et al. | |
| 4,415,279 A | 11/1983 | Beuse et al. | |
| 4,436,438 A | 3/1984 | Voznick | |
| 4,488,516 A | 12/1984 | Bueters et al. | |
| 4,527,908 A | 7/1985 | Arisi | |
| 4,722,609 A | 2/1988 | Epstein et al. | |
| 4,722,610 A | 2/1988 | LeVert et al. | |
| 4,826,540 A | 5/1989 | Mele | |
| 4,919,543 A | 4/1990 | Davis et al. | |
| 4,968,151 A | 11/1990 | Thomson | |
| 5,004,356 A | 4/1991 | Matsui | |
| 5,064,604 A | 11/1991 | Barton | |
| 5,233,868 A | 8/1993 | Coats et al. | |
| 5,568,121 A | 10/1996 | Lamensdorf | |
| 5,743,646 A | 4/1998 | O'Connell et al. | |
| 5,980,102 A | 11/1999 | Stulen et al. | |
| 6,158,886 A | 12/2000 | Dutcher et al. | |
| 6,252,510 B1 | 6/2001 | Dungan | |
| 6,367,970 B1 | 4/2002 | Danielson | |
| 6,473,710 B1 | 10/2002 | Eryurek | |
| 6,485,174 B1 | 11/2002 | Albrecht et al. | |
| 6,503,221 B1 | 1/2003 | Briggs et al. | |
| 6,670,887 B2 | 12/2003 | Dungan | |
| 6,681,625 B1 | 1/2004 | Berkcan et al. | |
| 6,794,991 B2 | 9/2004 | Dungan | |
| 6,824,305 B1 | 11/2004 | Boyd et al. | |
| 6,848,373 B2 | 2/2005 | Breen et al. | |
| 6,883,369 B1 | 4/2005 | Myhre | |
| 7,089,778 B2 | 8/2006 | Rabenecker et al. | |
| 7,220,050 B2 | 5/2007 | Esprimont et al. | |
| 7,246,452 B1 | 7/2007 | Roy | |
| 7,249,583 B2 | 7/2007 | Massao et al. | |
| 7,249,883 B2 | 7/2007 | Kuroda et al. | |
| 7,249,885 B2 | 7/2007 | Van Den Ende et al. | |
| 7,345,590 B2 | 3/2008 | Nakano et al. | |
| 7,395,173 B2 | 7/2008 | Kautz et al. | |
| 7,624,632 B1 | 12/2009 | Hoyle et al. | |
| 7,789,554 B2 | 9/2010 | Sattler et al. | |
| 8,057,093 B2 | 11/2011 | Sattler | |
| 8,092,085 B2 | 1/2012 | Kawase et al. | |
| 8,141,826 B1 | 3/2012 | Gallardo et al. | |
| 8,280,674 B2 | 10/2012 | Schwerer et al. | |
| 8,302,491 B2 | 11/2012 | Stack | |
| 8,358,105 B2 | 1/2013 | Baden et al. | |
| 8,360,635 B2 | 1/2013 | Huang et al. | |
| 8,591,102 B2 | 11/2013 | Frach et al. | |
| 8,671,890 B2 | 3/2014 | Davidson | |
| 8,851,745 B2 | 10/2014 | Sakami | |
| 9,970,828 B2 | 5/2018 | Ude | |
| 10,041,860 B2 | 8/2018 | Rahman | |
| 10,317,295 B2 | 6/2019 | Rud et al. | |
| 10,386,246 B2 | 8/2019 | Disselnkoetter et al. | |
| 10,670,546 B2 * | 6/2020 | Rud | G01N 25/18 |
| 10,760,742 B2 * | 9/2020 | Rud | F17D 5/06 |
| 2001/0053172 A1 | 12/2001 | Sakowsky et al. | |
| 2002/0064206 A1 | 5/2002 | Gysling et al. | |
| 2002/0104929 A1 | 8/2002 | Cunningham et al. | |
| 2003/0219062 A1 | 11/2003 | Egidio | |
| 2004/0101030 A1 | 5/2004 | Trapasso et al. | |
| 2005/0038172 A1 | 2/2005 | Nimberger et al. | |
| 2005/0109100 A1 | 5/2005 | Eldridge | |
| 2005/0114068 A1 | 5/2005 | Chey et al. | |
| 2005/0223828 A1 | 10/2005 | Olin | |
| 2006/0045164 A1 | 3/2006 | Schuh et al. | |
| 2006/0048568 A1 | 3/2006 | Korniyenko et al. | |
| 2006/0050767 A1 | 3/2006 | Fleming | |
| 2007/0068588 A1 | 3/2007 | Britton | |
| 2007/0183478 A1 | 8/2007 | Becker et al. | |
| 2007/0296541 A1 * | 12/2007 | Garcia | G01K 1/14 338/22 R |
| 2008/0083446 A1 | 4/2008 | Chakraborty et al. | |
| 2008/0277159 A1 | 11/2008 | Liepold | |
| 2009/0110023 A1 | 4/2009 | Clark, Jr. et al. | |
| 2009/0183463 A1 | 7/2009 | Osborn et al. | |
| 2009/0260431 A1 | 10/2009 | Olin et al. | |
| 2009/0296781 A1 | 12/2009 | Weber et al. | |
| 2010/0158073 A1 | 6/2010 | Marks | |
| 2010/0246630 A1 | 9/2010 | Kaszynski et al. | |
| 2010/0257871 A1 | 10/2010 | Venkatasubramanian et al. | |
| 2010/0316086 A1 | 12/2010 | Engelstad et al. | |
| 2011/0308548 A1 | 12/2011 | Amundsen et al. | |
| 2012/0056046 A1 | 3/2012 | Seryi | |
| 2012/0067542 A1 | 3/2012 | Frach et al. | |
| 2012/0109572 A1 | 5/2012 | Shimizu | |
| 2012/0128024 A1 | 5/2012 | Tsuchida et al. | |
| 2013/0005372 A1 | 1/2013 | Strei et al. | |
| 2013/0087327 A1 | 4/2013 | Nguyen et al. | |
| 2014/0056325 A1 | 2/2014 | Guerra et al. | |
| 2014/0161151 A1 | 6/2014 | Proctor et al. | |
| 2014/0177673 A1 | 6/2014 | Bliss et al. | |
| 2014/0348205 A1 | 11/2014 | Shaw et al. | |
| 2015/0177206 A1 | 6/2015 | Basham et al. | |
| 2015/0185085 A1 | 7/2015 | Converse | |
| 2015/0204830 A1 | 7/2015 | Arunachalam | |
| 2016/0003685 A1 | 1/2016 | Walla et al. | |
| 2016/0047697 A1 | 2/2016 | Decker et al. | |
| 2016/0076689 A1 | 3/2016 | Kato | |
| 2016/0298317 A1 | 10/2016 | Trescott | |
| 2017/0059498 A1 | 3/2017 | Yeh | |
| 2017/0069925 A1 | 3/2017 | Barari et al. | |
| 2017/0074730 A1 | 3/2017 | Rieder et al. | |
| 2017/0184456 A1 | 6/2017 | Chatterjee | |
| 2017/0212065 A1 * | 7/2017 | Rud | G01K 7/427 |
| 2017/0284870 A1 | 10/2017 | Golden et al. | |
| 2018/0003655 A1 | 1/2018 | Rud et al. | |
| 2018/0010978 A1 | 1/2018 | Bailey | |
| 2018/0238741 A1 | 8/2018 | Rud et al. | |
| 2019/0277711 A1 | 9/2019 | Rud | |
| 2019/0293241 A1 * | 9/2019 | Rud | E03B 7/071 |
| 2020/0036397 A1 | 3/2020 | Rud | |
| 2020/0103293 A1 * | 4/2020 | Rud | G01K 13/02 |
| 2020/0150064 A1 * | 5/2020 | Rud | G01N 25/18 |
| 2020/0363018 A1 * | 11/2020 | Rud | G01N 17/008 |
| 2020/0408580 A1 * | 12/2020 | Gebhardt | G01K 13/02 |

FOREIGN PATENT DOCUMENTS

| | | | | |
|---|---|---|---|---|
| CN | 205786481 U | 12/2016 | | |
| CN | 206311228 U | 7/2017 | | |
| EP | 0908712 A | 4/1999 | | |
| EP | 0908712 A1 | 4/1999 | | |
| EP | 1079219 A2 | 2/2001 | | |
| FR | 2724727 A1 | 3/1996 | | |
| FR | 2724727 A1 * | 3/1996 | | G01K 1/143 |
| JP | 11325322 A | 11/1999 | | |
| JP | 2010031948 A | 2/2010 | | |
| RU | 98240 U1 | 10/2010 | | |
| RU | 2466365 C1 | 11/2012 | | |
| WO | 1991014161 A1 | 9/1991 | | |
| WO | 2002057764 A3 | 7/2002 | | |
| WO | 2009130535 A1 | 10/2008 | | |

(56) References Cited

FOREIGN PATENT DOCUMENTS

| WO | 2013132239 A3 | 9/2013 |
| WO | 2014037257 A3 | 7/2014 |
| WO | 20150135739 A | 9/2015 |
| WO | 2017131546 A1 | 8/2017 |
| WO | 2017182491 A1 | 10/2017 |

OTHER PUBLICATIONS

International Search Report and Written Opinion dated Jun. 6, 2019, for International Patent Application No. PCT/RU2018/000629, 8 pages.
Search Report and Office Action dated Oct. 11, 2021 for Russian Patent Applicaton No. 2021111829, 19 pages including English translation.

\* cited by examiner

NON-INVASIVE PROCESS FLUID TEMPERATURE INDICATION WITH REDUCED ERROR

BACKGROUND

Many industrial processes convey process fluids through pipes or other conduits. Such process fluids can include liquids, gasses, and sometimes entrained solids. These process fluid flows may be found in any of a variety of industries including, without limitation, hygienic food and beverage production, water treatment, high-purity pharmaceutical manufacturing, chemical processing, the hydrocarbon fuel industry, including hydrocarbon extraction and processing as well as hydraulic fracturing techniques utilizing abrasive and corrosive slurries.

It is common to place a temperature sensor within a thermowell, which is then inserted into the process fluid flow through an aperture in the conduit. However, this approach may not always be practical in that the process fluid may have a very high temperature, be very corrosive, or both. Additionally, thermowells generally require a threaded port or other robust mechanical mount/seal in the conduit and thus, must be designed into the process fluid flow system at a defined location. Accordingly, thermowells, while useful for providing accurate process fluid temperatures, have a number or limitations.

More recently, process fluid temperature has been estimated by measuring an external temperature of a process fluid conduit, such as a pipe, and employing a heat flow calculation. This external approach is considered non-invasive because it does not require any aperture or port to be defined in the conduit. Accordingly, such non-intrusive approaches can be deployed at virtually any location along the conduit.

As recent advances have improved the accuracy of process fluid temperature estimation using non-invasive techniques, new sources of error have been identified. Addressing and correcting these new sources of error will improve the accuracy of non-invasive process fluid temperature estimation.

SUMMARY

A process fluid temperature estimation system includes a mounting assembly, a sensor capsule, measurement circuitry, and a controller. The mounting assembly is configured to mount the process fluid temperature estimation system to an external surface of a process fluid conduit. The sensor capsule has an end configured to contact the external surface of the process fluid conduit to form an interface having a contact region and an air gap. The sensor capsule also has at least one temperature sensitive element disposed therein. The measurement circuitry is coupled to the sensor capsule and configured to detect an electrical characteristic of the at least one temperature sensitive element that varies with temperature and provide at least process fluid conduit skin temperature information. The controller is coupled to the measurement circuitry and is configured to obtain the process fluid conduit skin temperature information from the measurement circuitry and to obtain reference temperature information. The controller is configured to obtain a heat flow parameter related to the air gap of the interface and to employ a heat transfer calculation with the process fluid conduit skin temperature information, reference temperature information, and heat flow parameter to generate an estimated process fluid temperature output.

A process fluid temperature estimation system is provided having a sensor capsule with a plurality of bores disposed therein. The bores are configured such that the end of one bore is closer to a sensing end of the sensor capsule than the end of the other bore.

A process fluid temperature estimation system with a sensor capsule having a curved end is also provided along with a method of providing non-invasive process fluid temperature estimation relative to a process fluid conduit having a curved surface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described herein generally leverage identification and appreciation of additional sources of error in non-invasive process fluid temperature estimation in order to provide solutions with increased accuracy. Two sources of error have been identified and various embodiments described herein can provide solutions to one or both sources.

A first source of error is variability in the heat flow path from a first temperature measurement point to a second temperature measurement point. Often the second temperature measurement point is located within an electronics housing of the process fluid estimation system itself and thus the heat flow from the conduit surface sensor (i.e. the sensor measuring a skin temperature of a process fluid conduit) to the reference temperature sensor (e.g., located within the electronics housing) must be tightly controlled. This means that the system must always be mounted the same distance from the process fluid conduit outer surface. This requirement can eliminate some potential applications for non-invasive process fluid temperature estimation, such as remote mount and high-temperature applications. Additionally, the primary heat path from the process fluid conduit to the electronics housing is generally through a sensor sheath. This makes the measurement highly susceptible to changing ambient conditions and can require a user to install insulation around the sensor. This can limit the accuracy of the system and require additional costs and labor for the end user.

A second source of error is generally believed to be caused by a relatively flat end of a sensor capsule contacting a curved process fluid conduit such as a pipe. This air gap between the flat surface and the curved process fluid conduit varies depending on the curvature of the process fluid conduit. As can be appreciated, in order to provide a solution that is usable with a wide range of diameters, addressing this source of error is important as well.

Figure 1:
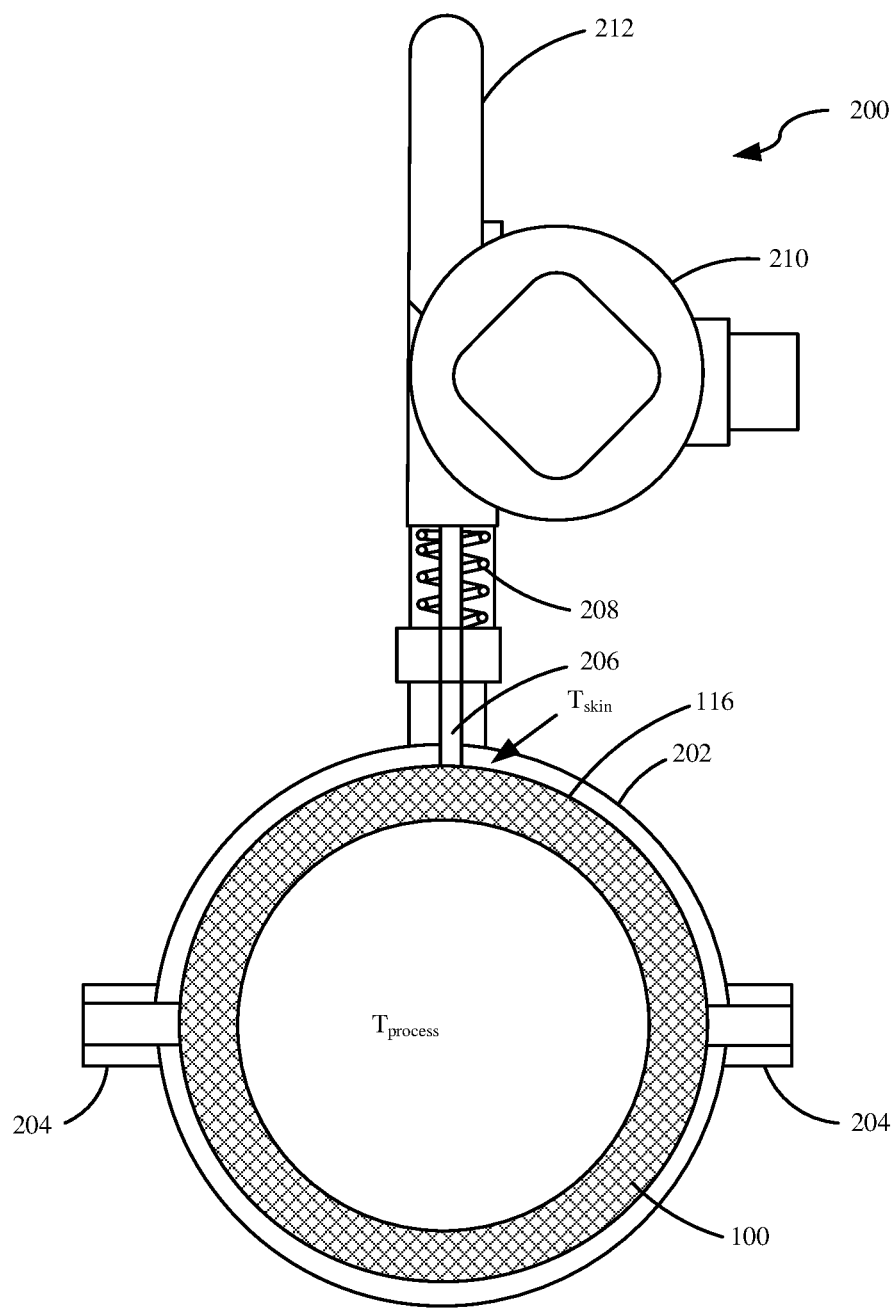
FIG. 1 is a diagrammatic view of a heat flow measurement system with which embodiments of the present invention are particularly applicable.

FIG. 1 is a diagrammatic view of a heat flow measurement system with which embodiments of the present invention are particularly applicable. System 200 generally includes a pipe clamp portion 202 that is configured to clamp around conduit or pipe 100. Pipe clamp 202 may have one or more clamp ears 204 in order to allow the clamp portion 202 to be positioned and clamped to pipe 100. Pipe clamp 202 may replace one of clamp ears 204 with a hinge portion such that pipe clamp 202 can be opened to be positioned on a pipe and then closed and secured by clamp ear 204. While the clamp illustrated with respect to FIG. 1 is particularly useful, any suitable mechanical arrangement for securely positioning system 200 about an exterior surface of a pipe can be used in accordance with embodiments described herein.

System 200 includes heat flow sensor capsule 206 that is forced against external diameter 116 of pipe 100 by spring 208. The term "capsule" is not intended to imply any particular structure or shape and can thus be formed in a variety of shapes, sizes and configurations. While spring 208 is illustrated, those skilled in the art will appreciate that various techniques can be used to force sensor capsule 206 into contact with external diameter 116 of conduit 100. Sensor capsule 206 generally includes one or more temperature sensitive elements, such as resistance temperature devices (RTDs). Sensors within capsule 206 are electrically connected to transmitter circuitry within housing 210, which is configured to obtain one or more temperature measurements from sensor capsule 206 and calculate an estimate of the process fluid temperature based on the measurements from sensor capsule 206, and a reference temperature, such as a temperature measured within housing 210 or one of the sensors of capsule 206, or otherwise provided to circuitry within housing 210.

In one example, the basic heat flow calculation can be simplified into:

$$T_{corrected} = T_{skin} + (T_{skin} - T_{reference}) * (R_{pipe}/R_{sensor}).$$

In this equation, $T_{skin}$ is the measured temperature of the external surface of the conduit. Additionally, $T_{reference}$ is a second temperature obtained relative to a location having a fixed thermal impedance ($R_{sensor}$) from the temperature sensor that measures $T_{skin}$. $R_{pipe}$ is the thermal impedance of the conduit and can be obtained manually by obtaining pipe material information, pipe wall thickness information. Additionally, or alternately, a parameter related to $R_{pipe}$ can be determined during a calibration and stored for subsequent use. Accordingly, using a suitable heat flow calculation, such as that described above, circuitry within housing 210 is able to calculate an estimate for the process fluid temperature ($T_{corrected}$) and convey an indication regarding such process fluid temperature to suitable devices and/or a control room. In the example illustrated in FIG. 1, such information may be conveyed wirelessly via antenna 212.

Figure 2:
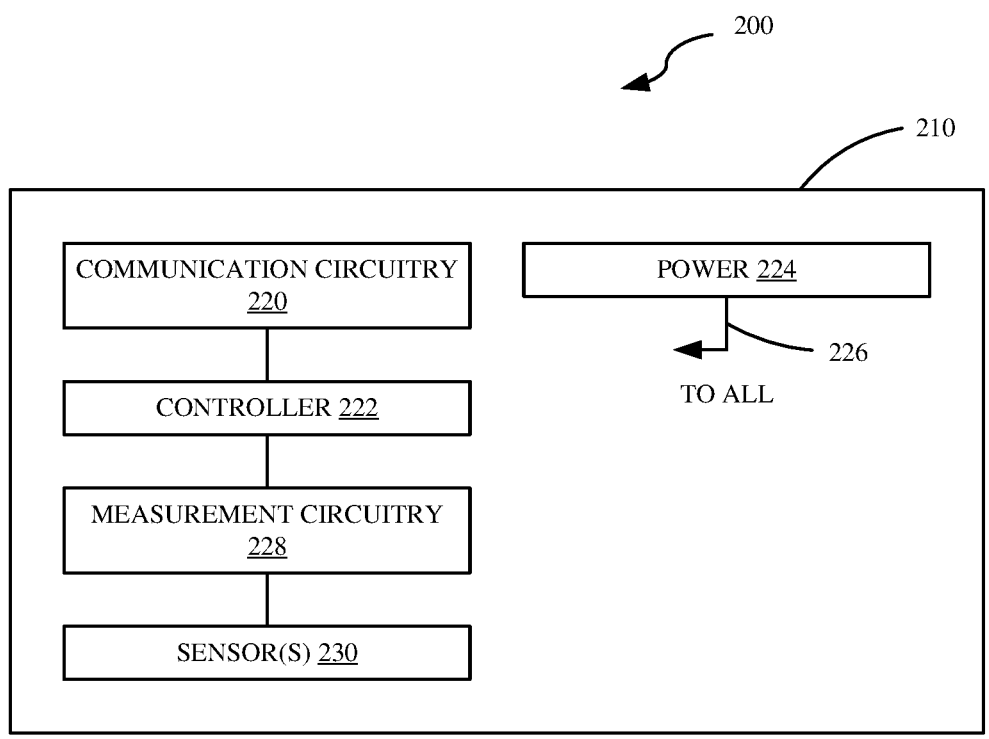
FIG. 2 is a block diagram of circuitry within a heat flow measurement system, with which embodiments of the present invention are particularly applicable.

FIG. 2 is a block diagram of circuitry within housing 210 of heat flow measurement system 200, with which embodiments of the present invention are particularly applicable. System 200 includes communication circuitry 220 coupled to controller 222. Communication circuitry 220 can be any suitable circuitry that is able to convey information regarding the estimated process fluid temperature. Communication circuitry 220 allows heat flow measurement system 200 to communicate the process fluid temperature output over a process communication loop or segment. Suitable examples of process communication loop protocols include the 4-20 milliamp protocol, Highway Addressable Remote Transducer (HART®) protocol, FOUNDATION™ Fieldbus Protocol, and the WirelessHART protocol (IEC 62591).

Heat flow measurement system 200 also includes power supply module 224 that provides power to all components of system 200 as indicated by arrow 226. In embodiments where heat flow measurement system 200 is coupled to a wired process communication loop, such as a HART® loop, or a FOUNDATION™ Fieldbus segment, power module 224 may include suitable circuitry to condition power received from the loop or segment to operate the various components of system 200. In such a wired process communication loop embodiments, power supply module 224 may provide suitable power conditioning to allow the entire device 200 to be powered by the loop to which it is coupled. In other embodiments, when wireless process communication is used, power supply module 224 may include a source of power, such as a battery and suitable conditioning circuitry.

Controller 222 includes any suitable arrangement that is able to generate a heat-flow based process fluid temperature estimate using measurements from sensor(s) within capsule 206 and an additional reference temperature, such as a terminal temperature within housing 210 or a temperature measurement from a second temperature sensor disposed within capsule 206. The reference temperature, in some applications, may be known or estimated for a well-controller process or ambient environment (e.g. the system is located within a climate controlled facility). In one example, controller 222 is a microprocessor. Controller 222 is communicatively coupled to communication circuitry 220.

Measurement circuitry 228 is coupled to controller 222 and provides digital indications with respect to measurements obtained from one or more temperature sensors 230. Measurement circuitry 228 can include one or more analog-to-digital converters and/or suitable multiplexing circuitry to interface the one or more analog-to-digital converters to sensors 230. Additionally, measurement circuitry 228 can include suitable amplification and/or linearization circuitry as may be appropriate for the various types of temperature sensors employed.

Figure 3A:
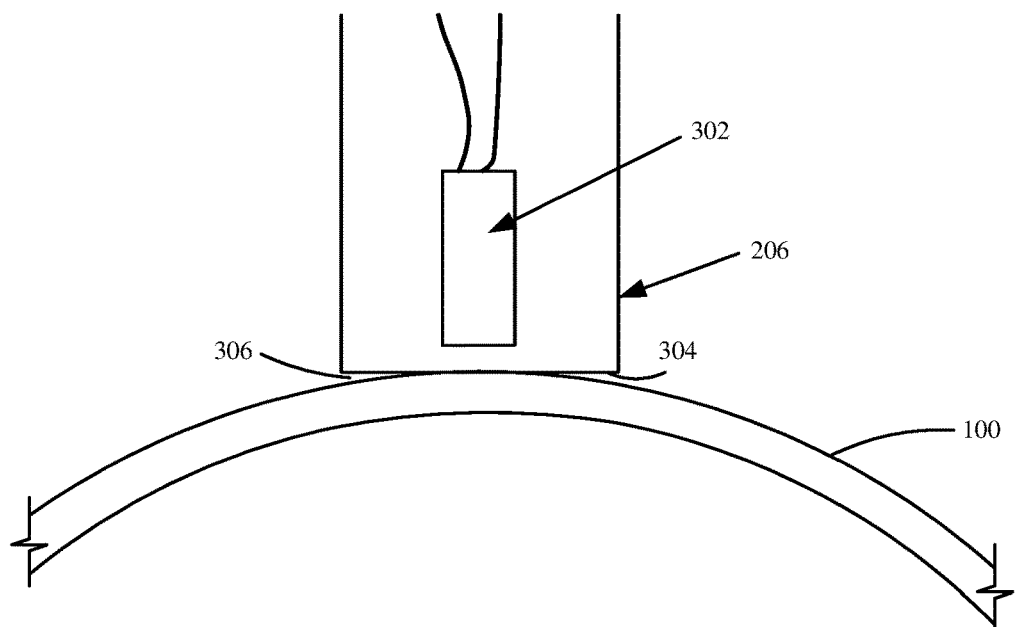
FIGS. 3A and 3B are an enlarged depictions of a sensor capsule interface relative to process fluid conduits with different diameters.
Figure 3B:
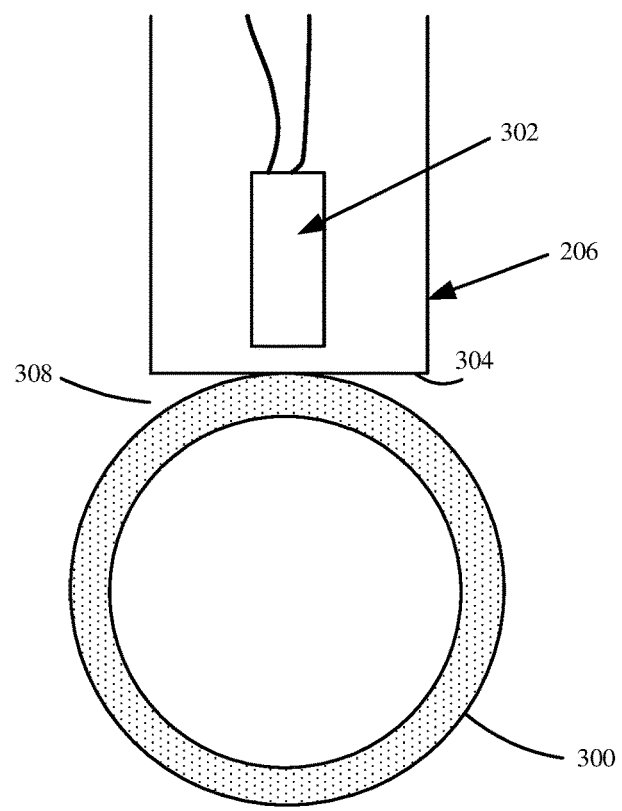

FIGS. 3A and 3B are diagrammatic views of sensor capsule 206 as it contacts different process fluid conduits 100, 300, respectively. In order to illustrate the variation in air gap caused by different curvatures, two process fluid conduits 100 and 300 are shown. Sensor capsule 206 is shown containing an RTD element 302 therein. Sensor capsule 206 has a relatively flat lower surface 304 that contacts the process fluid conduit. As shown, when flat surface 304 contacts large-diameter process fluid conduit 100, a relatively small air gap 306 is formed between process fluid conduit 100 and flat surface 304. However, as shown in FIG. 3B, when a smaller-diameter process fluid conduit 300 is used, the higher curvature of the process fluid conduit creates a larger air gap 308 between flat surface 304 and the smaller-diameter process fluid conduit 300. The thermal conductivity between the two interfaces contains a small interface air gap that makes up a significant part of the required correction. The corrected temperature estimation is provided by the equation set forth below;

$$T_{corrected} = T_{sensor} + (T_{sensor} - T_{reference}) * (R_{pipe} + R_{other}) / (R_{sensor}).$$

In the above equation, the air gap thermal resistance is included in the $R_{other}$ parameter.

Figure 3C:
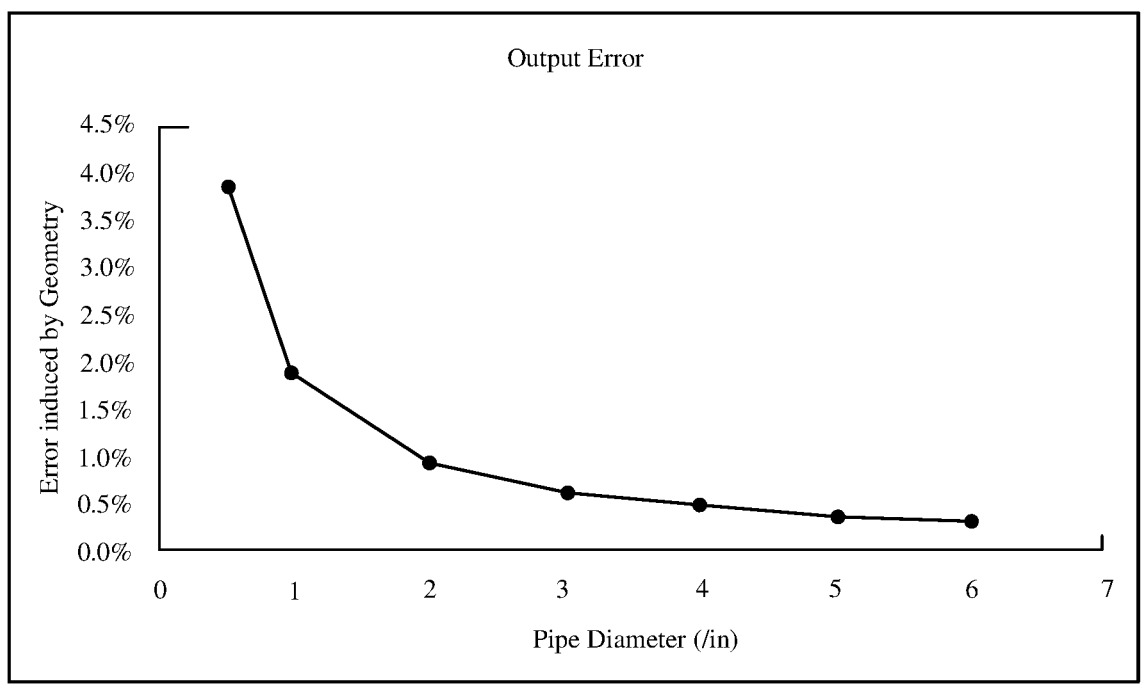
FIG. 3C is a chart illustrating error induced by conduit geometry as a function of conduit diameter.

FIG. 3C is a chart illustrating error induced by conduit geometry as a function of conduit diameter. As can be seen, for smaller diameters, the error induced by the geometry can climb significantly. In accordance with one embodiment of the present invention, controller 222 (shown in FIG. 2) is provided with an indication of pipe diameter upon which the process fluid temperature estimation system will be used. The pipe diameter is then used to access an error mapping or compensation curve in order to identify an appropriate parameter that models the air gap thermal resistance for the particular conduit being used. A default value can be set that is appropriate for a wide range of diameters, such as setting a default pipe diameter as 2 or 3 inches. However, an end user can specify a smaller pipe diameter during ordering and acquire a system already having the specified pipe diameter for the compensation curve. Alternately, the pipe diameter can be communicated to controller 222 via process communication using communication circuitry 220 or entered manually via a user interface (not shown). Using such a compensation curve or lookup table, the non-invasive process fluid temperature estimation system can automatically correct for the geometry differences between the sensor capsule and the surface of the process fluid conduit.

As the pipe diameter decreases, the air gap increases exponentially requiring more correction for small diameter conduits. The compensation curve provides a thermal resistance parameter ($R_{other}$) based on pipe diameter that is typically configured by the user. The compensation calculation, set forth above, then adjusts the correction ratio appropriately to provide a more accurate output. Additional configuration options that can be communicated to controller 222 or entered via user interface can indicate if the sensor is mounted perpendicular to a selected geometry, such as a pipe, flat surface, etc.

Figure 4:
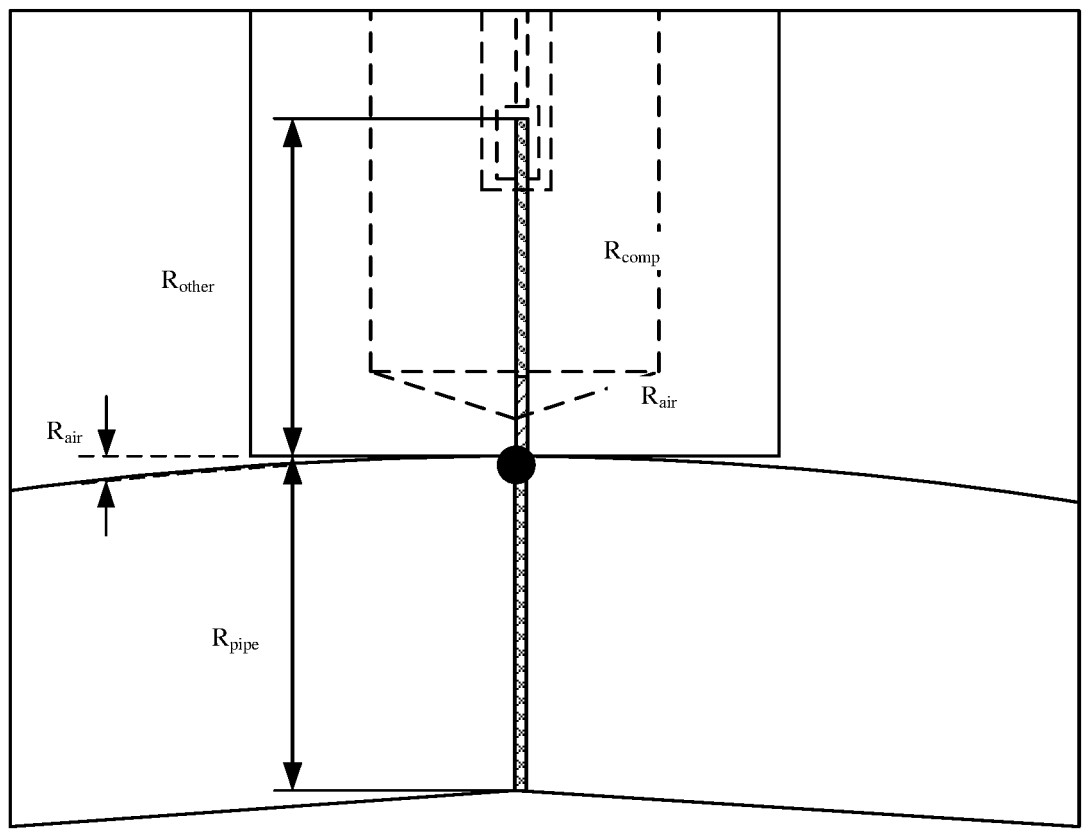
FIG. 4 is a diagrammatic view illustrating thermal resistance of various portions of a sensor capsule/conduit interface.

FIG. 4 is a diagrammatic view illustrating various thermal resistance parameters in the sensor capsule/process fluid conduit interface. The diagram shown in FIG. 4 is significantly zoomed relative to that shown in FIG. 3A. The small interface air gap ($R_{air}$) is also included. Even though this appears small, $R_{air}$ is the largest contributor to thermal impedance. In one example, values for the various parameters are set forth in the table below.

| Parameter | Description | Length (m) | Thermal Conductivity | Thermal Resistance |
|---|---|---|---|---|
| $R_{comp}$ | Thermal Grease | 0.0023 | 3.5 | 0.000657143 |
| $R_{arg}$ | Silver End Cap | 0.00170016 | 429 | 3.96308E−06 |
| $R_{air}$ | Interface Air Gap | 0.00005 | 0.026 | 0.001923077 |
| $R_{other}$ | $R_{comp} + R_{arg} + R_{air}$ | | | |

As set forth above, providing an $R_{other}$ parameter that is changeable based on the diameter of the process fluid conduit significantly improves the accuracy of the process fluid temperature estimation calculation set forth above. Further, improved accuracy can still be provided if changes in the end cap material (e.g. something other than silver) is provided as long as the map of compensation curve provided to controller 222 includes an indication of thermal conductivity and length for the selected end cap. The same can be done for variations in thermal grease length and composition. Additionally, it is expressly contemplated that if a diameter is used that is not expressly matched to a given $R_{air}$ parameter, embodiments described herein can interpolate between the two nearest data points.

Another source of error in process fluid temperature estimation using non-invasive techniques is the potential variability in heat flow from the process fluid conduit skin temperature measurement to a reference temperature measurement. In accordance with another embodiment described herein, this heat flow variability is substantially minimized or at least controlled by providing two temperature sensors disposed within the same sensor capsule and spaced from one another along a heat flow path.

Figure 5A:
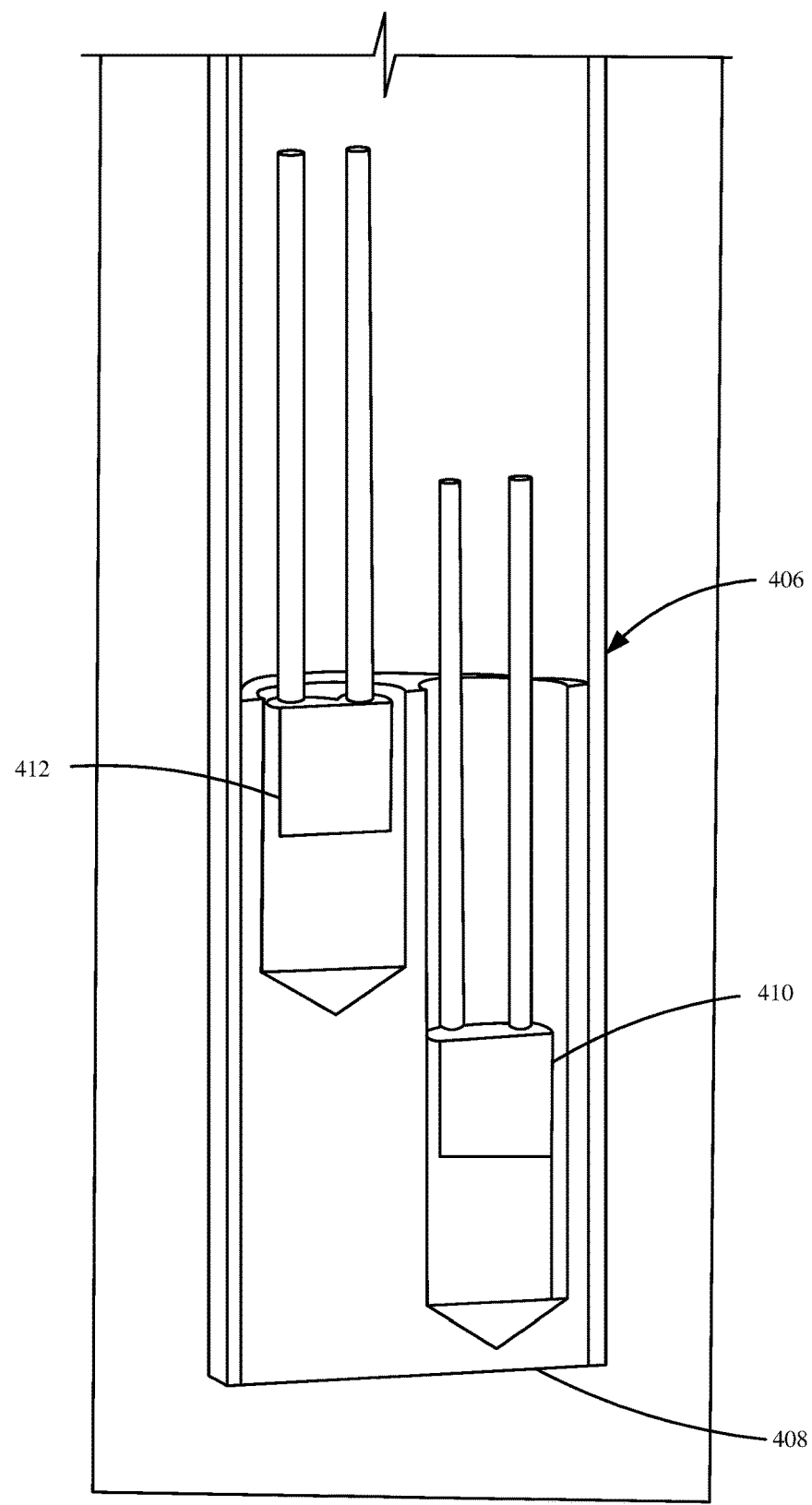
FIG. 5A is a diagrammatic view of a portion of an improved sensor capsule in accordance with an embodiment of the present invention.

FIG. 5A is a diagrammatic view of an improved sensor capsule employing a staggered bore process fluid temperature estimation system in accordance with one embodiment of the present invention. As used herein, "staggered bore" means that two bores have a different distance from the external surface of the process fluid conduit and that they also have an offset in at least one other dimension (e.g. along an axis of the conduit, and/or in a direction perpendicular to the axis of the conduit). Sensor capsule 406 employs a machined tip 408 into which multiple sensing elements 410 and 412 are mounted. Sensing elements 410 and 412 are preferably RTD's and are connected to wires running through the length of sensor capsule 406 to be coupled to measurement circuitry 228 (shown in FIG. 2). Sensing elements 410, 412 are held in place within sensor capsule 406 using either mechanical or chemical (i.e. bonding) techniques. The cap can then be welded onto the tube to seal the tip. The machined tip provides precise and consistent sensor spacing between elements 410 and 412. These machined parts are relatively easy to inspect and improve consistency of assembly by allowing the sensors inserted in them to bottom out. This eliminates potential problems of inconsistent element mounting within the sensor capsule since error can arise when the spacing between the elements and the surface directly affects the measurements. Additionally, or alternatively, portions of the sensor capsule may be 3D printed in order to facilitate production of more complicated features, such as square holes.

The materials used for tip 408 can vary significantly. Materials with high thermal conductivity, such as copper and silver can be used to improve heat transfer but choosing a material with intentionally low thermal conductivity could allow the spacing between elements 410 and 412 to be much smaller and thus to reduce the overall cost. Tip 408 could also be varied to match the pipe and clamp material in order to eliminate galvanic corrosion concerns. As the material of a component of the sensor capsule is varied, the size and thermal conductivity of the component can be stored in the lookup table or compensation curve in order to accurately estimate process fluid temperature. Each material, accordingly, would have different thermal properties and would affect the process fluid temperature estimation, and such variations can be accommodated in the $R_{other}$ parameter of the calculation.

However, in one example, a single block of homogenous material is used to mount elements 410, and 412 and thus corrections for heat flow between the sensing elements 410 and 412, are easily made. For example, sensing element 410 may be considered a skin temperature sensor and sensing element 412 may be considered a reference temperature sensor. The difference in the measured temperatures will be related to the magnitude of the heat flow through the block of homogenous material and its thermal conductivity. Increasing the precision of placement of elements 410 and 412 allows the spacing between elements 410 and 412 to be reduced thus reducing the overall size of sensor capsule 406. It is believed that this will improve the linearity of the heat gradient across elements 410 and 412 and make the response less affected by external influences. It is preferred, in one example, that temperature sensitive elements 410 and 412 be RTDs, since such devices are generally believed to have higher accuracy and repeatability than other types of temperature sensitive elements, such as thermocouples.

Figure 5B:
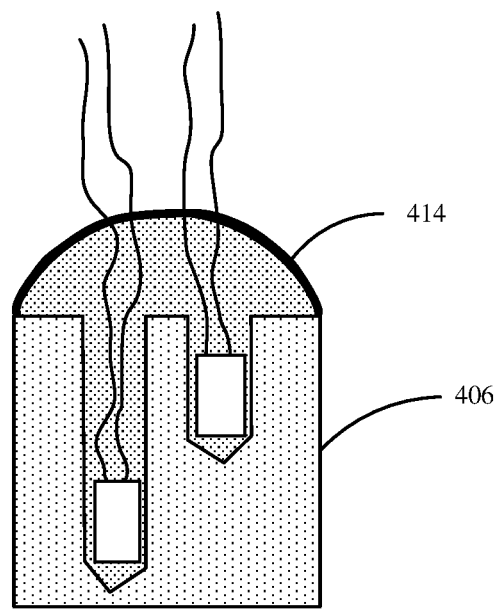
FIG. 5B is a diagrammatic view of a portion of the sensor capsule shown in FIG. 5A with an encapsulation material applied.

FIG. 5B shows a portion of sensor capsule 406 where epoxy or some other suitable encapsulation 414 has been applied. Epoxy 414 ensures that temperature sensitive elements 410 and 412 remain secured within their respective bores and also helps to provide strain relief where the lead wires of each individual temperature sensitive element attach to the temperature sensitive element. Accordingly, the machined tip and sensing elements could be prebuilt into a metal capsule with wires. This could allow late customization during manufacture to build a sensor to a final length while maintaining consistency of the measurement.

Figure 6:
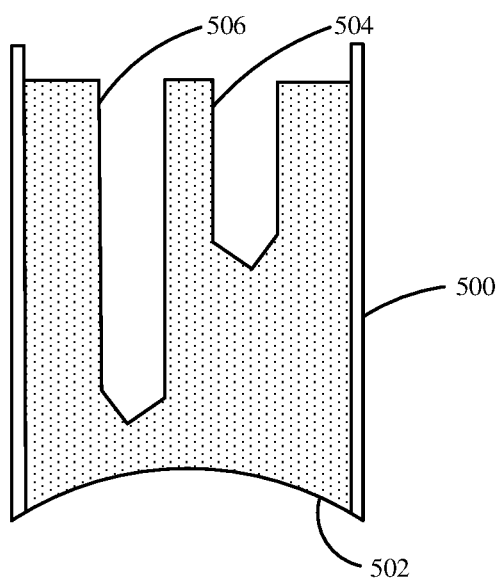
FIG. 6 is a diagrammatic view of the portion of a sensor capsule in accordance with an embodiment of the present invention.

FIG. 6 is a diagrammatic view of a portion of a sensor capsule providing a staggered bore for a plurality of temperatures sensitive elements, as well as a curved end to match the curvature of a selected process fluid conduit. In this sense, the embodiment illustrated in FIG. 6 can be thought of as addressing both sources of error. By providing a curvature to end 502 that is matched to the curvature of the process fluid conduit, an air gap between end 502 and the process fluid conduit is minimized. Further, providing a staggering between bores 504 and 506 using machining techniques provides a highly reliable location technique for temperature sensors, such as elements 410 and 412, to be mounted therein. Since the curvature of surface 502 must be selected during the ordering process, the embodiment shown in FIG. 6 is not particularly amenable to an end user making changes to process fluid conduit diameters without requiring an entirely new sensor capsule 500.

Figure 7:
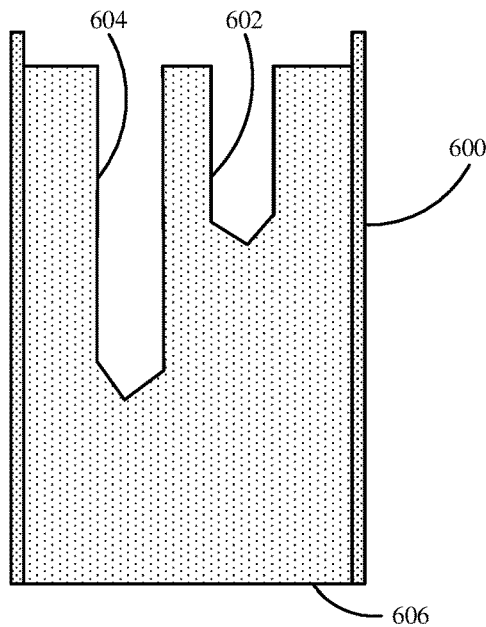
FIG. 7 is a diagrammatic view of a portion of a sensor capsule in accordance with another embodiment of the present invention.

FIG. 7 is a diagrammatic view of a portion of a sensor capsule in accordance with another embodiment of the present invention. Sensor capsule 600 includes bores 602 and 604 terminating further from flat surface 606 (i.e. the hot end) than the embodiments shown in FIGS. 5A, 5B, and 6. Terminating bores 602 and 604 further from surface 606 may reduce high temperature exposure to the sensitive elements, which may provide additional advantages for higher temperature applications.

Figure 8:
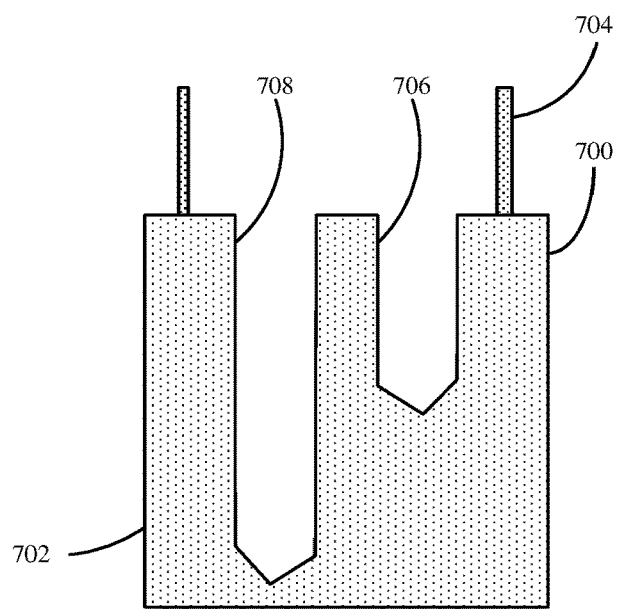
FIG. 8 is a diagrammatic view of a portion of a sensor capsule in accordance with another embodiment of the present invention.

FIG. 8 illustrates another portion of a sensor capsule in accordance with another embodiment of the present invention. Specifically, sensor capsule 700 includes machined tip 702 that is larger or equal diameter to tube 704 to provide more space for sensing elements within bores 706, 708. Tip 702 is attached to tube 704 in accordance with any suitable techniques, such as welding.

Figure 9:
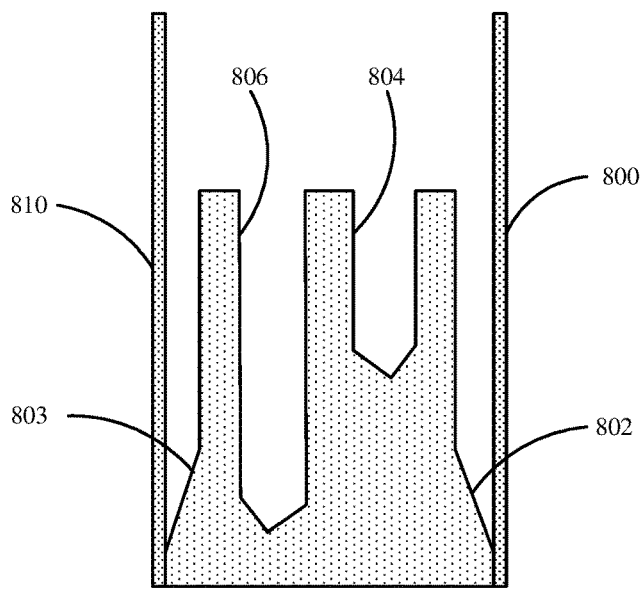
FIG. 9 is a diagrammatic view of a portion of a sensor capsule in accordance with another embodiment of the present invention.

FIG. 9 is a diagrammatic view of a portion of a sensor capsule 800 in accordance with another embodiment of the present invention. Sensor capsule 800 includes an insert 802 that that is formed to include bores 804, 806. Bores 804, 806, are sized to receive temperature sensitive elements, such as elements 410, 412 (shown in FIG. 5A). Additionally, the walls of insert 802 may be tapered away from side wall 810 of a tube in order to provide better insulation from ambient conditions.

Figure 10:
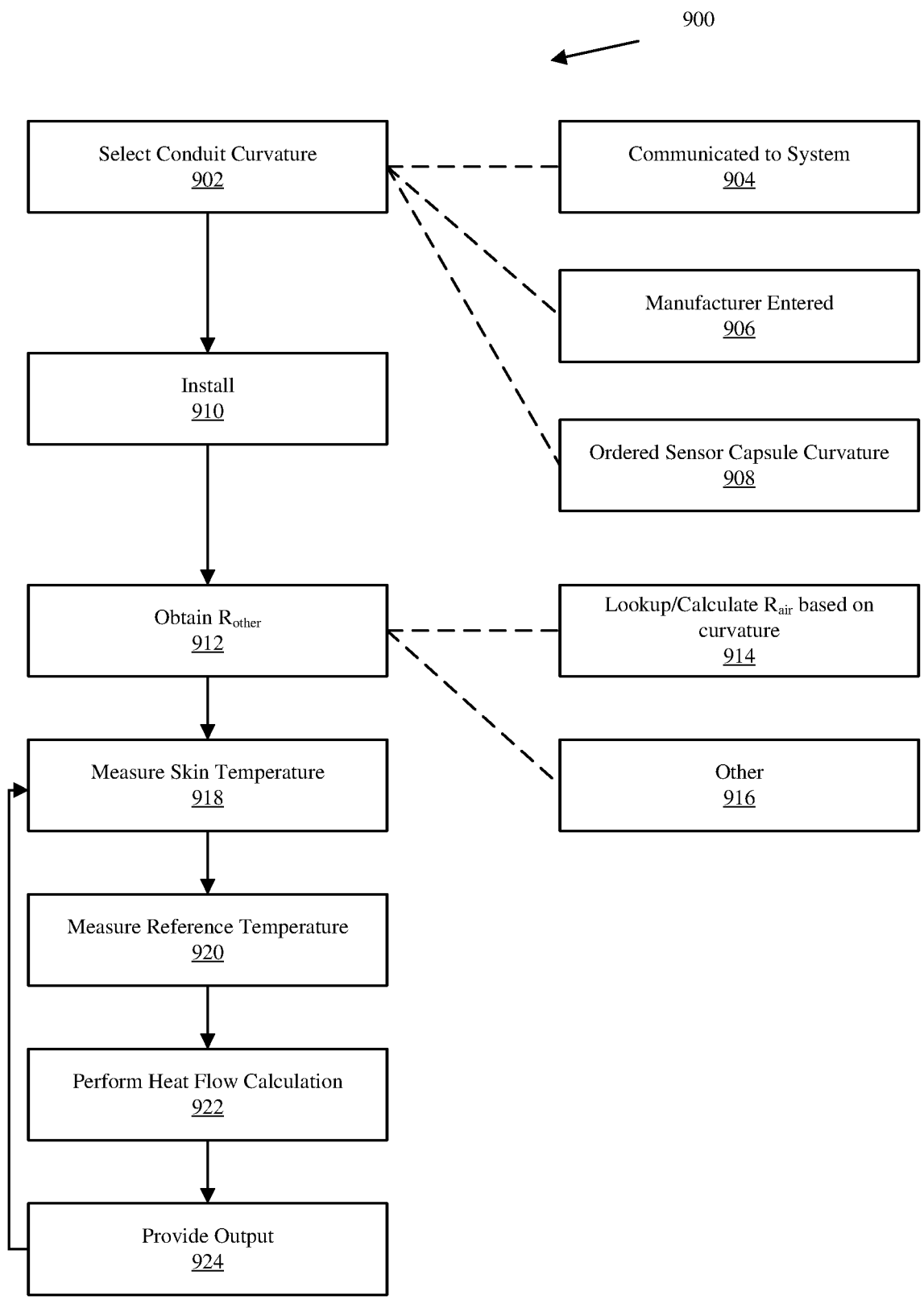
FIG. 10 is a flow diagram of a method of estimating process fluid temperature non-invasively in accordance with an embodiment of the present invention.

FIG. 10 is a flow diagram of a method of estimating process fluid temperature non-invasively in accordance with an embodiment of the present invention. Method 900 begins at block 902 where an end user provides an indication of conduit curvature. Such indication can be provided in the form of communication (e.g. process communication and/or interaction with a user interface) to a process fluid temperature estimation system, as indicated at block 904. Alternatively, the indication can be provided to a manufacturer during acquisition of the process fluid temperature system, such that the curvature of the conduit is already entered into the system when it is shipped to the end user, as indicated at block 906. The curvature can also be set by the end user ordering a system with a sensor capsule having a curvature that matches the curvature of the conduit, as indicated at block 908.

At block 910, the process fluid estimation system is installed on the process fluid conduit. Next, at block 912, the $R_{other}$ term is obtained or calculated. Note, for embodiments that do not have a sensor capsule with a conduit-matched curved end, the $R_{other}$ parameter will have a value that is influenced by $R_{air}$ based on the diameter of the process fluid conduit, as indicated at block 914. As set forth above, the $R_{other}$ parameter may be obtained from a lookup table based on the selected conduit curve. Further, other heat flow variables, such as end cap thickness and/or material can be obtained from a lookup table. Further still, thermal grease heat flow information can also be obtained. These other factors that affect $R_{other}$ are indicated diagrammatically at reference numeral 916.

Next, at block 918, the system obtains a skin temperature of the process fluid conduit. At block 920, a reference temperature is measured. The reference temperature may be obtained from a temperature sensor coupled to a terminal located within an electronics housing of the system or it may be obtained from an additional temperature sensitive element located within the sensor capsule but positioned in such a way that a known thermal impedance exists between the skin temperature sensor and the reference temperature sensor, such as shown in FIGS. 5-9.

At block 922, controller 222 (shown in FIG. 2) performs a heat flow calculation using the measured skin temperature, reference temperature, and $R_{other}$. In embodiments where the sensor capsule has a curved end that matches the curvature of the process fluid conduit, the $R_{other}$ parameter may not include a value for $R_{air}$. However, in such cases, $R_{other}$ may still model other heat flow characteristics, such as the heat flow through the curved cap as well as through the particular thermal grease employed. At block 924, the estimation of process fluid temperature, based on the heat flow calculation performed at block 922, is provided as an output. Then, method 900 repeats by returning to block 918 to obtain another skin temperature.

As set forth above, a number of embodiments of the present invention have been set forth that provide various solutions to multiple sources of error in non-invasive process fluid temperature estimation systems. Embodiments may include any combination of the solutions set forth above. Although the present invention has been described with reference to preferred embodiments, workers skilled in the art will recognize that changes may be made in form and detail without departing from the spirit and scope of the invention.

What is claimed is:

1. A process fluid temperature estimation system comprising:
    a mounting assembly configured to mount the process fluid temperature estimation system to an external surface of a process fluid conduit;
    a sensor capsule having an end configured to contact the external surface of the process fluid conduit to form an interface having a contact region and an air gap, the sensor capsule having at least one temperature sensitive element disposed therein;
    measurement circuitry coupled to the sensor capsule and configured to detect an electrical characteristic of the at least one temperature sensitive element that varies with temperature and provide at least process fluid conduit skin temperature information;
    a controller coupled to the measurement circuitry, the controller being configured to:
        obtain the process fluid conduit skin temperature information from the measurement circuitry;
        obtain reference temperature information,
        obtain a heat flow parameter related to the air gap of the interface, and
        employ a heat transfer calculation with the process fluid conduit skin temperature information, reference temperature information, and heat flow parameter to generate an estimated process fluid temperature output.

2. The process fluid temperature estimation system of claim 1, wherein the sensor capsule has a flat end and the external surface of the process fluid conduit is curved and wherein the air gap is disposed between the flat end and the curved external surface of the process fluid conduit.

3. The process fluid temperature estimation system of claim 1, wherein the reference temperature information is obtained by the controller using the measurement circuitry.

4. The process fluid temperature estimation system of claim 3, wherein the reference temperature information is obtained from measurement circuitry that is coupled, to an additional temperature sensitive element disposed in an electronics housing of the process fluid temperature estimation system.

5. The process fluid temperature estimation system of claim 3, wherein the at least one temperature sensitive element is a skin temperature sensitive element and a reference temperature sensitive element and wherein the measurement circuitry is coupled to the reference temperature sensitive element in the sensor capsule.

6. The process fluid temperature estimation system of claim 5, wherein the skin temperature sensitive element and the reference temperature sensitive element are each disposed in respective first and second machined bores in the sensor capsule.

7. The process fluid temperature estimation system of claim 6, wherein each of the reference temperature sensitive element and the skin temperature sensitive element are resistive temperature sensitive devices.

8. The process fluid temperature estimation system of claim 7, wherein the skin temperature sensitive element is disposed proximate an end of the first bore within the sensor capsule and the reference temperature sensitive element is disposed proximate an end of the second bore within the sensor capsule, raid wherein a distance between the end of the first bore and the end of the sensor capsule is less than a distance between the end of the second bore and the end of the sensor capsule.

9. The process fluid temperature estimation system of claim 8, wherein each of the reference temperature sensitive element and the skin temperature sensitive element is disposed within one of thermal grease and epoxy in its respective staggered bore.

10. The process fluid temperature estimation system of claim 9, wherein the controller is further configured to obtain a second heat flow parameter related to the thermal grease and perform the heat flow calculation using the skin temperature information, reference temperature information, and heat flow parameters to generate the estimated process fluid temperature output.

11. A process fluid temperature estimation system comprising:
    a mounting assembly configured to mount the process fluid temperature estimation system to a curved external surface of a process fluid conduit;
    a sensor capsule having a curved end configured to contact the curved external surface of the process, fluid conduit, the sensor capsule having at least one temperature sensitive element disposed therein;
    measurement circuitry coupled to the sensor capsule and configured to detect an electrical characteristic of the at least one temperature sensitive element that varies with temperature, and provide at least process fluid conduit skin temperature information;
    a controller coupled to the measurement circuitry, the controller being configured to:
        obtain the process fluid conduit skin temperature information from the measurement circuitry;
        obtain reference temperature information,
        employ a heat transfer calculation with the process fluid conduit skin temperature information, and reference temperature information to generate an estimated process fluid temperature output; and
    wherein the at least one temperature sensitive element is a skin temperature sensitive element and a reference temperature sensitive element and wherein the measurement circuitry is coupled to the reference temperature sensitive element in the sensor capsule; and
    wherein reference temperature sensitive element and the skin temperature sensitive element are each disposed in respective first and second machined bores in the sensor capsule.

12. The process fluid temperature estimation system of claim 1, wherein the reference temperature information is obtained by the controller using the measurement circuitry.

13. The process fluid temperature estimation system of claim 11, wherein the skin temperature sensitive element is disposed proximate an end of the first bore within the sensor capsule and the reference temperature sensitive element is disposed proximate an end of the second bore within the sensor capsule, and wherein a distance between the end of the first bore and the end of the sensor capsule is less than a distance between the end of the second bore and the end of the sensor capsule.

14. The process fluid temperature estimation system of claim 11, wherein the controller is further configured to obtain a heat flow parameter related to the sensor capsule and perform the heat flow calculation using the process fluid conduit skin temperature information, reference temperature information, and heat flow parameter.

15. The process fluid temperature estimation system of claim 14, wherein the heat flow parameter is related to an end cap of the sensor capsule.

16. The process fluid temperature estimation system of claim 14, wherein the heat flow parameter is related to a thermal grease disposed within the sensor capsule.

17. A method of providing non-invasive process fluid temperature estimation relative to a process fluid conduit having a curved surface, the method comprising:
receiving an indication of process fluid conduit curvature;
coupling a sensor capsule to the curved external surface of the process fluid conduit, wherein the sensor capsule contains a skin temperature sensitive element;
obtaining a process fluid conduit skin temperature from the skin temperature sensitive element;
obtaining a reference temperature from a reference temperature sensor disposed at a location having a fixed thermal impedance from a location where the process fluid conduit skin temperature was obtained;
obtaining a heat flow parameter related to an air pp caused by the external surface of the process fluid conduit; and
employing a heat flow calculation using the process fluid conduit skin temperature, the reference temperature, and the heat flow parameter to provide a process fluid temperature estimation that is at least partially compensated for error caused by the process fluid conduit curvature.

18. The method of claim 17, wherein receiving an indication of process fluid conduit curvature includes storing information related to the process fluid conduit curvature within a process fluid estimation system.

19. The method of claim 17, wherein receiving an indication of process fluid conduit curvature includes selecting a sensor capsule having a curved end that is substantially matched to the curvature of the curved surface of the process fluid conduit.

20. A process fluid temperature estimation system comprising:
a mounting assembly configured to mount the process fluid temperature estimation system to a curved external surface of a process fluid conduit;
a sensor capsule having an end configured to contact the curved external surface of the process fluid conduit, the sensor capsule including a first temperature sensitive element disposed proximate an end of a first bore within the sensor capsule, and a second temperature sensitive element disposed proximate an end of a second bore within the sensor capsule, wherein a distance between the end of the first bore and the end of the sensor capsule is less than a distance between the end of the second bore and the end of the sensor capsule;
measurement circuitry coupled to the first and second temperature sensitive elements and configured to detect an electrical characteristic of each of the first and second temperature sensitive elements that varies with temperature and provide at least process fluid conduit skin temperature information and reference temperature in formation;
a controller coupled to the measurement circuitry, the controller being configured to:
obtain the process fluid conduit skin temperature information and reference temperature information from the measurement circuitry; and
employ a heat transfer calculation with the process fluid conduit skin temperature information, and reference temperature information to generate an estimated process fluid temperature output.

21. The process fluid temperature estimation system of claim 20, and further comprising an insert positioned in the sensor capsule, the insert having the first and second bores.

22. The process fluid temperature estimation system of claim 21, wherein the insert includes a wall that is tapered away from a sidewall of the sensor capsule to insulate the first and second temperature sensitive elements from ambient conditions.

* * * * *